S. GARWOOD.
DRIVING MECHANISM.
APPLICATION FILED NOV. 30, 1920.
1,419,555. Patented June 13, 1922.
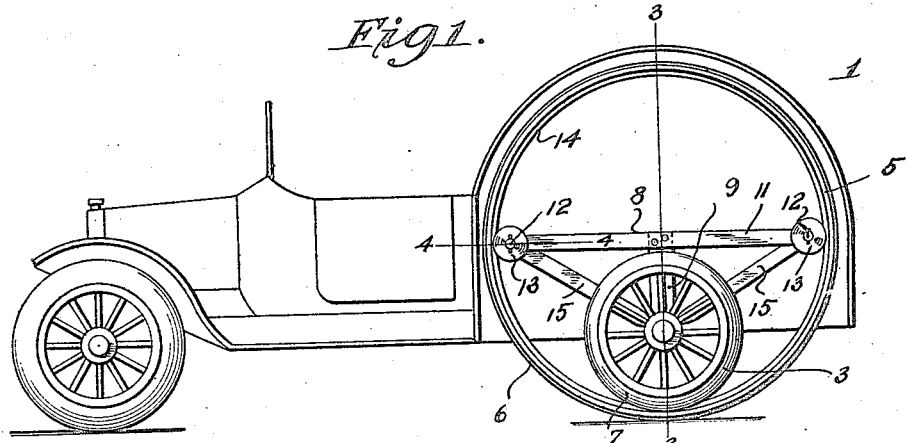
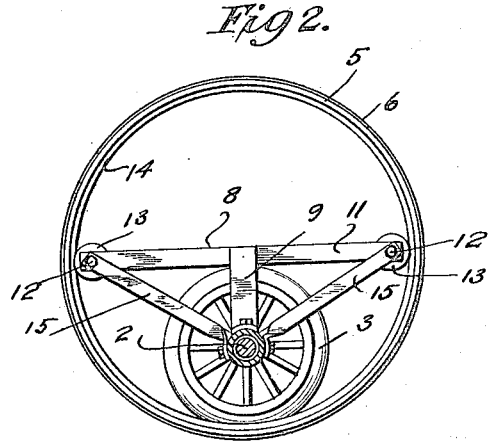
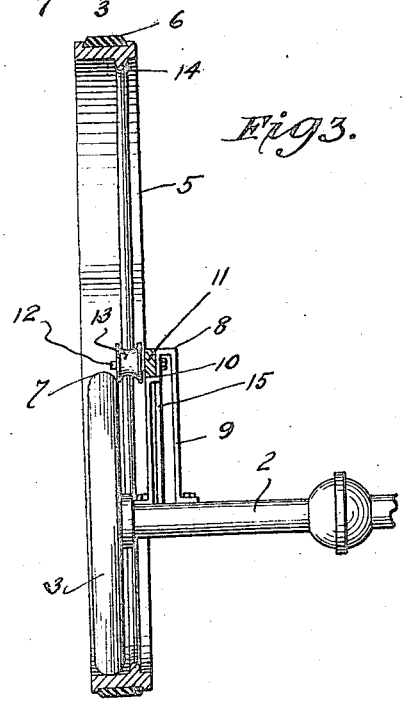
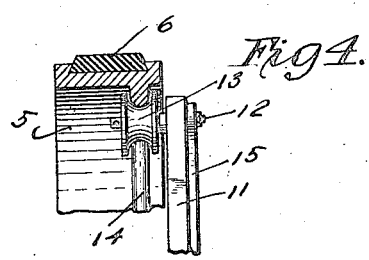
Inventor
Spencer Garwood.
By C. C. Shepherd.
Attorney

UNITED STATES PATENT OFFICE.

SPENCER GARWOOD, OF EAST LIBERTY, OHIO.

DRIVING MECHANISM.

1,419,555.	Specification of Letters Patent.	Patented June 13, 1922.

Application filed November 30, 1920. Serial No. 427,358.

*To all whom it may concern:*

Be it known that SPENCER GARWOOD, a citizen of the United States, residing at East Liberty, in the county of Logan and State of Ohio, has invented certain new and useful Improvements in Driving Mechanism, of which the following is a specification.

This invention relates to improvements in driving mechanism for motor vehicles, and has for its primary object to produce a driving mechanism wherein the driving wheels of a motor vehicle are arranged to rotate within relatively enlarged outer or tread wheels, whereby said mechanism will be capable of enabling a vehicle equipped therewith to travel smoothly, easily and efficiently over rough, sandy and muddy road-ways, and to enable the power of the machine to be more efficiently delivered, so that the maximum power of the engine may be utilized in effecting the propulsion of the vehicle.

The invention primarily consists in the provision of an improved frame structure between the driving and tread wheels, which structure serves to maintain the wheels of the mechanism in proper driving relationship and to enable the power of the driving wheels to be effectively transmitted to the tread wheels.

With these and other objects in view, as will appear as the description proceeds, the invention accordingly consists in the novel features of construction, combinations of elements and arrangements of parts, hereinafter to be fully described, and to have the scope thereof set forth in the following claim.

In the accompanying drawings, forming a part of this specification, and in which similar characters of reference denote like and corresponding parts throughout the several views thereof.

In said drawings:

Figure 1 is a side elevation of a motor vehicle equipped with the driving mechanism comprising the present invention, Figure 2 is a vertical sectional view disclosing more particularly the tread wheel and the associated frame structure, Figure 3 is a vertical transverse sectional view taken along the plane disclosed by the line 3—3 of Figure 1, and Figure 4 is a detail vertical sectional view taken along the line 4—4 of Figure 1.

Referring more particularly to the details of the invention, the numeral 1 designates any standard or conventional form of a motor driven vehicle which may be for example a passenger car or a commercial truck.

The vehicle 1 includes the usual rear axle construction 2 and an associated driving wheel 3, the latter being carried in the customary manner by the shaft 4 arranged to project through the axle construction 2, said shaft being driven in the usual manner from the motor, not shown, of the vehicle, in order that power may be delivered to the wheel or wheels 3.

In order to promote the movement of the motor vehicle, each of the driving wheels 3 is positioned within an annular relatively enlarged tread wheel 5, which is so disposed as to eccentrically surround its cooperative driving wheel 3, in substantially the manner disclosed in Figure 1. As stated, the wheel 5 is of annular formation and has its outer periphery provided with a resilient tire 6, whereby the passage of said tread wheel over road surfaces will be facilitated. The inner periphery of the wheel 5 is of smooth annular formation and constitutes in effect an endless circular track for the tread 7 of the wheel 3, whereby the latter will be caused to rotate at all times over a comparatively smooth and uninterrupted surface, a feature which enables the vehicle 1 to be comfortably driven without encountering undue jolting, and also, to enable the vehicle 1 to be driven under conditions which would be substantially impossible if the tread wheels were omitted.

The essence of the present invention resides in the provision of an improved frame structure 8 which is adapted to be positioned to retain the tread wheel 5 in proper relationship with respect to the drive wheel 3, and to preclude lateral movement between said wheels. To this end, the rear axle construction to the rear of the wheel 3 is provided with an upstanding bracket 9, which is bolted or otherwise secured to the casing forming the construction 2. The upper end of this bracket is provided with a notch 10, in which is seated a horizontally extending diameter bar 11, the latter being provided at its outer ends with axles 12, upon which are rotatably mounted guide wheels 13. These wheels are grooved, as shown in Figure 4, and are disposed to engage with an annular rib 14 provided upon the inner periphery of the tread wheel 5. Also, secured to the axle construction 2 and extending radially from the latter are diagonal braces 15, which have their outer ends connected with the axles 12, whereby the frame structure as a whole will be rendered staunch and durable and capable of resisting lateral stresses.

By the construction described, it will be manifest that a driving mechanism is provided which will be capable of enabling a motor vehicle to be driven comfortably and efficiently over various kinds of roadways or other surfaces, and that the occupants of the vehicle will not be subjected to disagreeable or uncomfortable jolting or jostling. The frame structure is such that the driving relationship between the wheels 3 and 5 will be maintained and also the power delivered to the wheels 3 will be so imparted to the wheel 5 that the propulsion of a vehicle as a whole may be effected with less effort and power than when the wheels 3 are used directly in engagement with the roadway. It will be observed that the tires 7 will be constantly provided with a smooth surface upon which to run, and hence the life of the tires will be considerably lengthened by not engaging with destroying surfaces and substances. Moreover, the construction enables the tires 7 to operate in their usual resilient manner, thus enabling the vehicle to be comfortably driven. It will be appreciated that the wheel 5 may be suitably encased when employed upon a motor vehicle, in order that the same will be out of the way and to avoid an unattractive appearance. The provision of such a casing is of course within the province of the invention.

What is claimed is:

In a motor vehicle, the combination with the rear axle construction thereof including a stationary housing and a drive shaft, a driving wheel fixed to rotate with said shaft, a relatively enlarged tread wheel arranged to receive and surround said driving wheel, the inner periphery of said tread wheel constituting an endless circular track for said drive wheel, a bracket arising vertically and rigidly from said housing, a horizontally disposed bar rigidly connected with the upper end of said bracket, rollers mounted upon the outer ends of said bar and disposed to engage with an annular guiding rib provided upon the inner periphery of the tread wheel, and diagonal braces extending from said housing to the outer ends of said bar.

In testimony whereof I affix my signature.

SPENCER GARWOOD.